(No Model.)
A. R. McLEAN.
FRUIT GATHERER.
No. 492,824. Patented Mar. 7, 1893.
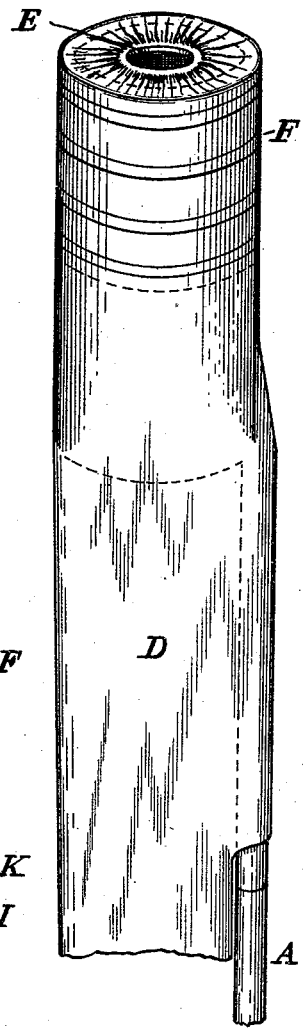
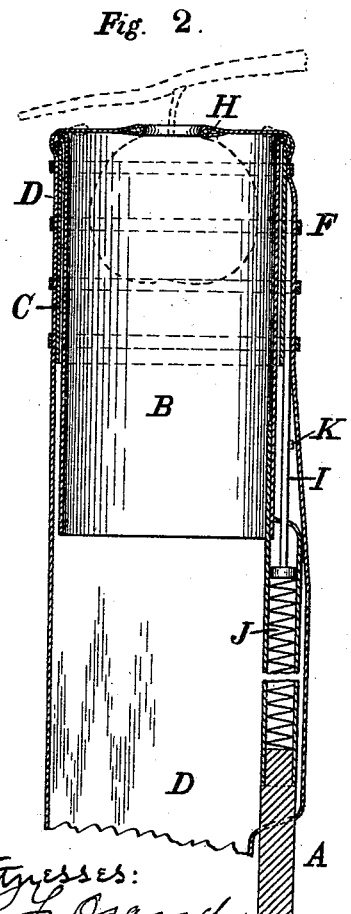
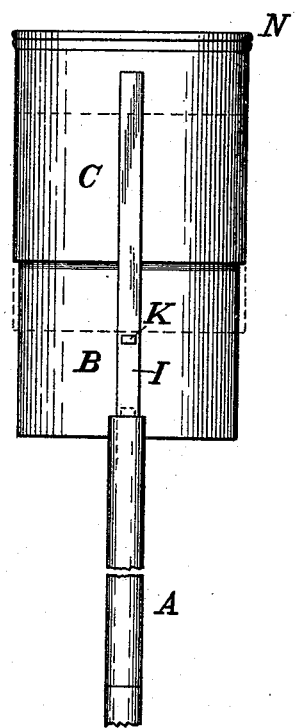
Witnesses:
R. F. Osgood,
C. J. Cranwell.
Inventor:
Aaron R. McLean.
By Geo. B. Selden,
atty.
THE NORRIS PETERS CO., PHOTO-LITHO., WASHINGTON, D. C.

UNITED STATES PATENT OFFICE.

AARON R. McLEAN, OF ROCHESTER, NEW YORK, ASSIGNOR TO CHARLES L. YATES, OF SAME PLACE.

FRUIT-GATHERER.

SPECIFICATION forming part of Letters Patent No. 492,824, dated March 7, 1893.

Application filed August 17, 1892. Serial No. 443,307. (No model.)

*To all whom it may concern:*

Be it known that I, AARON R. McLEAN, a citizen of the United States, residing at Rochester, in the county of Monroe, in the State of New York, have invented an Improved Fruit-Gatherer, of which the following is a specification, reference being had to the accompanying drawings.

My invention relates to an improvement in fruit gatherers, which improvement is fully described and illustrated in the following specification and the accompanying drawings,—the novel features thereof being specified in the claims annexed to the said specification.

My improved fruit-gatherer is represented in the accompanying drawings.

Figure 1 is a perspective view. Fig. 2 is a central vertical section, showing the fruit in dotted lines. Fig. 3 is a side elevation,—the outer flexible tube being omitted.

My improved fruit-gatherer consists essentially of a suitable handle carrying two rigid tubes at its upper end, one of which is arranged to slide on the other, and has attached to it a flexible tube, which forms a distensible mouth for engaging the fruit, and also serves as a guide or conductor to convey the picked fruit downward to a basket or other suitable receptacle.

In the accompanying drawings, A represents the handle, B the rigid tube attached thereto, C the outer rigid tube, arranged to slide lengthwise on B, and D the flexible tube, which is puckered or shirred at its upper end, and provided with an elastic ring, so as to form the distensible mouth E, which closes on the fruit and detaches it from its support. The flexible tube D is attached to the outer sliding tube C, by the elastic bands F.

H is a ring of india-rubber or other elastic material sewed or otherwise secured about the elastic mouth of the flexible tube.

The inner tube B is secured to the handle in any suitable manner.

The outer tube C is provided with a rod I, which extends downward inside the handle A, and rests on a spiral spring J contained in the handle. The rod I is provided with a suitable stop K, which limits the downward movement of the tube.

At its upper end the inner tube B is provided with a bead N, which arrests the upward movement of the outer tube.

The manner of using my improved fruit-gatherer will have been already understood from the preceding description. The operator, holding the handle in one hand, presents the upper end of the instrument against the fruit which he desires to pick, and by drawing downward on the flexible conductor, distends its mouth E, as indicated by the dotted lines in Fig. 1, and then, after passing the distended mouth over the fruit, (see dotted lines in Fig. 2,) allows the mouth to contract about the stem, and finally detaches the fruit by pulling down on the handle. The conductor and handle may be made of any desired length, adapted to picking fruit from the tallest trees. The fruit is delivered from the conductor into the basket absolutely without any injury whatever.

In some cases the spring J may be dispensed with.

The flexible conductor may be fastened to the tube C in any suitable manner, but I prefer the elastic bands F, as they are easily replaced, and allow the conductor to be readily removed.

The flexible conductor is made of linen or cotton cloth, or other suitable fabric.

I claim—

1. The herein-described fruit-gatherer, comprising a handle carrying a suitable support, a tube arranged to slide on said support, and having attached to its outer surface a flexible tube having a distensible mouth, substantially as described.

2. The combination, with the handle A, of the supporting tube B, the sliding tube C, and the flexible tube D, having a distensible mouth surrounded by the elastic ring H, substantially as described.

3. The combination, of the handle A and supporting tube B, of the sliding tube C, rod I and spring J, and the flexible tube D, having a distensible mouth surrounded by the elastic ring H, substantially as described.

4. The combination, with the supporting ring B, of the sliding tube C, the flexible tube D, having a distensible mouth surrounded by the elastic ring H, and attached to the tube C by the elastic bands F, substantially as described.

AARON R. McLEAN.

Witnesses:
CHARLES L. YATES,
GEO. B. SELDEN.